United States Patent
Wu et al.

(10) Patent No.: US 12,028,169 B2
(45) Date of Patent: Jul. 2, 2024

(54) WIRELESS COMMUNICATION METHOD, RECEIVING-END DEVICE, AND SENDING-END DEVICE

(71) Applicant: GUANGDONG OPPO MOBILE TELECOMMUNICATIONS CORP., LTD., Guangdong (CN)

(72) Inventors: Zuomin Wu, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 321 days.

(21) Appl. No.: 17/521,765

(22) Filed: Nov. 8, 2021

(65) Prior Publication Data
US 2022/0060290 A1 Feb. 24, 2022

Related U.S. Application Data

(63) Continuation of application No. PCT/CN2019/091372, filed on Jun. 14, 2019.

(51) Int. Cl.
*H04L 1/18* (2023.01)
*H04L 1/1829* (2023.01)

(52) U.S. Cl.
CPC ................. *H04L 1/1854* (2013.01)

(58) Field of Classification Search
CPC ..... H04L 1/18; H04L 1/00; H04L 5/00; H04L 5/0048; H04L 5/0062; H04L 5/0051;
(Continued)

(56) References Cited

U.S. PATENT DOCUMENTS

| 7,570,916 B2 * | 8/2009 | Xiao | H04W 72/30 455/24 |
| 8,532,049 B2 * | 9/2013 | Higuchi | H04W 72/1263 370/330 |

(Continued)

FOREIGN PATENT DOCUMENTS

| CN | 102316518 | 1/2012 |
| CN | 102857325 | 1/2013 |

(Continued)

OTHER PUBLICATIONS

"International Search Report (Form PCT/ISA/210)" of PCT/CN2019/091372, mailed on Feb. 26, 2020, with English translation thereof, pp. 1-4.

(Continued)

*Primary Examiner* — Man U Phan
(74) *Attorney, Agent, or Firm* — JCIP GLOBAL INC.

(57) ABSTRACT

A wireless communication method, a receiving-end device, and a sending-end device are provided. When the sending-end device transmits data to at least two receiving-end devices, the at least two receiving-end devices may implement acknowledgement feedback, and the sending-end device may implement HARQ transmission. The wireless communication method includes: a receiving-end device receiving a first control channel sent by a sending-end device, wherein the first control channel is used to schedule a first data channel, the first data channel is used to transmit a first transmission block, the first transmission block includes information sent to the at least two receiving-end devices, and the at least two receiving-end devices include the receiving-end device; and the receiving-end device determining a first control resource, wherein the first control resource is used to transmit feedback information corre- (Continued)

sponding to the first transmission block in the first data channel.

14 Claims, 8 Drawing Sheets

(58) Field of Classification Search
CPC ........ H04L 27/26; H04L 5/10; H04W 72/042; H04W 72/0406; H04W 72/12; H04W 72/20; H04W 72/04
USPC .......................................................... 370/329
See application file for complete search history.

(56) References Cited

U.S. PATENT DOCUMENTS

| | | | |
|---|---|---|---|
| 11,025,396 B2* | 6/2021 | Tang | H04L 1/18 |
| 11,265,132 B2* | 3/2022 | Fujishiro | H04L 1/1854 |
| 11,356,205 B2* | 6/2022 | Guan | H04L 1/1812 |
| 11,510,230 B2* | 11/2022 | Zhao | H04L 5/0053 |
| 11,539,489 B2* | 12/2022 | Gong | H04L 27/26025 |
| 11,581,987 B2* | 2/2023 | Guan | H04L 5/0044 |
| 2008/0049749 A1 | 2/2008 | Xiao et al. | |
| 2020/0204329 A1 | 6/2020 | Fujishiro et al. | |
| 2021/0167901 A1* | 6/2021 | Tang | H04W 72/0446 |
| 2021/0314101 A1* | 10/2021 | Zhou | H04L 1/1861 |
| 2021/0409159 A1* | 12/2021 | Zhu | H04L 1/1861 |
| 2022/0385413 A1* | 12/2022 | Zhao | H04L 1/1864 |
| 2023/0231665 A1* | 7/2023 | Wu | H04L 1/1854 370/329 |

FOREIGN PATENT DOCUMENTS

| | | |
|---|---|---|
| CN | 102342059 | 2/2015 |
| CN | 106211093 | 12/2016 |
| CN | 107277922 | 10/2017 |
| WO | 2007052719 | 5/2007 |
| WO | 2018056108 | 3/2018 |

OTHER PUBLICATIONS

"Written Opinion of the International Searching Authority (Form PCT/ISA/237)" of PCT/CN2019/091372, mailed on Feb. 26, 2020, with English translation thereof, pp. 1-7.

Nokia et al., "Discussion on Sidelink groupcast HARQ", 3GPP TSG-RAN WG1 Meeting #96bis R1-1905340, Apr. 8-12, 2019, pp. 1-8.

LG Electronics, "Feature lead summary for agenda item 7.2.4.5 Physical layer procedures for sidelink", 3GPP TSG RAN WG1 #97 R1-1907682, May 13-17, 2019, pp. 1-26.

Lenovo et al., "SL HARQ operation", 3GPP TSG RAN WG2 Meeting #106 R2-1906733, May 13-17, 2019, pp. 1-4.

"Office Action of China Counterpart Application, Application No. 202211123704.9", with English translation thereof, issued on Aug. 11, 2023, p. 1-p. 19.

Samsung, "On Physical Layer Procedures for NR V2X", 3GPP TSG RAN WG1 #97 R1-1906941, May 13-17, 2019, pp. 1-16.

"Office Action of Europe Counterpart Application, Application No. 19932773.5", issued on May 23, 2023, p. 1-p. 8.

ITL, "Physical layer procedure for NR V2X", 3GPP TSG RAN WG1 #97 R1-1907414, May 13-17, 2019, pp. 1-4.

"Office Action of Europe Counterpart Application, Application No. 19932773.5", issued on Nov. 17, 2022, p. 1-p. 6.

"Search Report of Counterpart Europe Application No. 19932773.5", issued on May 20, 2022, p. 1-p. 10.

"Office Action of Europe Counterpart Application, Application No. 19932773.5", issued on Nov. 2, 2023, p. 1-p. 7.

"Office Action of China Counterpart Application, Application No. 202211123704.9", with English translation thereof, issued on Nov. 18, 2023, p. 1-p. 14.

"Office Action of China Counterpart Application, Application No. 202211123704.9", with English translation thereof, issued on Jan. 30, 2024, p. 1-p. 18.

* cited by examiner

WIRELESS COMMUNICATION METHOD, RECEIVING-END DEVICE, AND SENDING-END DEVICE

CROSS-REFERENCE TO RELATED APPLICATION

This application is a continuation of international PCT application serial no. PCT/CN2019/091372, filed on Jun. 14, 2019. The entirety of the above-mentioned patent application is hereby incorporated by reference herein and made a part of this specification.

BACKGROUND

Technical Field

The embodiments of the disclosure relate to the field of communications, and more specifically to a wireless communication method, a receiving-end device, and a sending-end device.

Description of Related Art

In the new radio (NR) system, the network device may periodically transmit some common messages, such as system messages, to multiple terminal devices through multicast, broadcast, or multicast. When the network device transmits the common messages, a relatively low code rate is usually used, so that most of the terminal devices can correctly receive the common messages. The terminal devices may periodically receive the common messages according to requirements without performing acknowledgement feedback. However, with the development of wireless communication technology, when a sending-end device adopts broadcast or multicast to transmit data information to multiple receiving-end devices, the sending-end device needs to know whether the receiving-end devices correctly receive the data information. Therefore, how to implement acknowledgement feedback based on multiple receiving-end devices is a technical issue that needs to be considered.

SUMMARY

The embodiments of the disclosure provide a wireless communication method, a receiving-end device, and a sending-end device. When the sending-end device transmits data to at least two receiving-end devices, the at least two receiving-end devices may implement acknowledgement feedback, and the sending-end device may implement hybrid automatic repeat request (HARQ) transmission.

In a first aspect, a wireless communication method is provided, which includes the following.

A receiving-end device receives a first control channel sent by a sending-end device. The first control channel is used to schedule a first data channel. The first data channel is used to transmit a first transmission block. The first transmission block includes information sent to at least two receiving-end devices. The at least two receiving-end devices include the receiving-end device.

The receiving-end device determines a first control resource. The first control resource is used to transmit feedback information corresponding to the first transmission block in the first data channel.

Optionally, the receiving-end device receives the first control channel sent by the sending-end device through broadcast or multicast.

In a second aspect, a wireless communication method is provided, which includes the following.

A sending-end device sends a first control channel and a first data channel to at least two receiving-end devices. The first control channel is used to schedule the first data channel. The first data channel is used to transmit a first transmission block. The first transmission block includes information sent to the at least two receiving-end devices. Feedback information corresponding to the first transmission block in the first data channel is transmitted through a first control resource.

The sending-end device detects the feedback information corresponding to the first transmission block in the first data channel on the first control resource.

Optionally, the sending-end device may send the first control channel and the first data channel to the at least two receiving-end devices through broadcast or multicast.

In a third aspect, a receiving-end device is provided, which is used to execute the method in the first aspect or each implementation thereof.

Specifically, the receiving-end device includes a functional module for executing the method in the first aspect or each implementation thereof.

In a fourth aspect, a sending-end device is provided, which is used to execute the method in the second aspect or each implementation thereof.

Specifically, the sending-end device includes a functional module for executing the method in the second aspect or each implementation thereof.

In a fifth aspect, a receiving-end device is provided, which includes a processor and a memory. The memory is used to store a computer program. The processor is used to call and run the computer program stored in the memory to execute the method in the first aspect or each implementation thereof.

In a sixth aspect, a sending-end device is provided, which includes a processor and a memory. The memory is used to store a computer program. The processor is used to call and run the computer program stored in the memory to execute the method in the second aspect or each implementation thereof.

In a seventh aspect, an apparatus is provided, which is used to implement the method in any one of the first aspect to the second aspect or each implementation thereof.

Specifically, the apparatus includes a processor, which is used to call and run a computer program from a memory, so that a device installed with the apparatus executes the method in any one of the first aspect to the second aspect or each implementation thereof.

In an eighth aspect, a computer-readable storage medium is provided, which is used to store a computer program. The computer program enables a computer to execute the method in any one of the first aspect to the second aspect or each implementation thereof.

In a ninth aspect, a computer program product is provided, which includes a computer program command. The computer program command enables a computer to execute the method in any one of the first aspect to the second aspect or each implementation thereof.

In a tenth aspect, a computer program is provided. When running the computer program on a computer, the computer is enabled to execute the method in any one of the first aspect to the second aspect or each implementation thereof.

Through the above technical solutions, the sending-end device sends the first control channel and the first data channel to the at least two receiving-end devices, and the at least two receiving-end devices may implement the acknowledgement feedback for the first transmission block transmitted in the first data channel on the first control resource, thereby implementing the acknowledgement feedback of the receiving-end devices for the same data to improve user experience.

DETAILED DESCRIPTION OF DISCLOSED EMBODIMENTS

The technical solutions in the embodiments of the disclosure will be described below in conjunction with the drawings in the embodiments of the disclosure. Obviously, the described embodiments are a part of the embodiments of the disclosure instead of all of the embodiments. Regarding the embodiments in the disclosure, all other embodiments obtained by persons skilled in the art without creative effort belong to the protection scope of the disclosure.

The embodiments of the disclosure may be applied to various communication systems, such as a global system of mobile communication (GSM) system, a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolution system of the NR system, an LTE-based access to unlicensed spectrum (LTE-U) system, an NR-based access to unlicensed spectrum (NR-U) system, a universal mobile telecommunication system (UMTS), a wireless local area networks (WLAN), a wireless fidelity (WiFi), a next-generation communication system, or other communication systems.

Generally speaking, the traditional communication system supports a limited number of connections and is easy to implement. However, with the development of communication technology, the mobile communication system not only supports traditional communication, but also supports, for example, device to device (D2D) communication, machine to machine (M2M) communication, machine type communication (MTC), vehicle to vehicle (V2V) communication, vehicle to everything (V2X) communication, etc. The disclosure may also be applied to the communication systems.

Optionally, the communication system in the embodiment of the disclosure may be applied to a carrier aggregation (CA) scenario, may also be applied to a dual connectivity (DC) scenario, and may also be applied to a standalone (SA) networking scenario.

The embodiments of the disclosure do not limit the applied frequency spectrum. For example, the embodiment of the disclosure may be applied to a licensed spectrum or an unlicensed spectrum.

Figure 1:
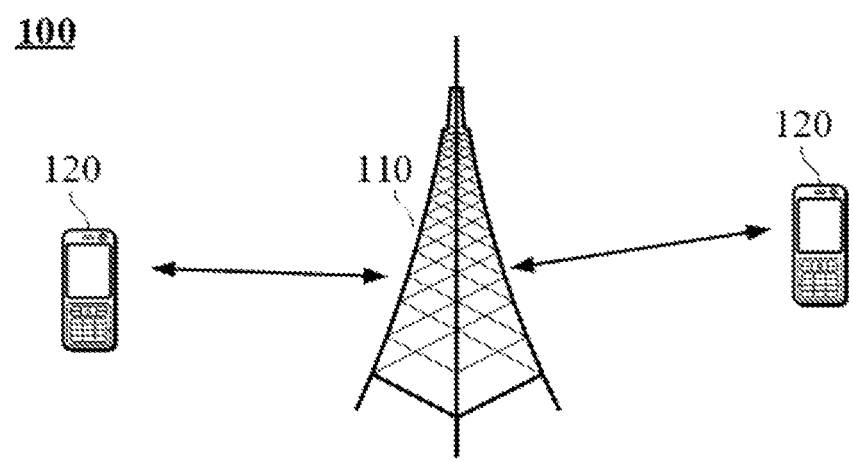
FIG. 1 is a schematic diagram of a communication system architecture according to the disclosure.

Exemplarily, a communication system 100 applied to the embodiment of the disclosure is shown in FIG. 1. The communication system 100 may include a network device 110. The network device 110 may be a device that communicates with a terminal device 120 (also referred to as a communication terminal or a terminal). The network device 110 may provide communication coverage for a specific geographic area and may communicate with a terminal device 120 located in the coverage area.

FIG. 1 exemplarily shows one network device 110 and two terminal devices 120. Optionally, the communication system 100 may include multiple network devices 110, and other numbers of terminal devices 120 may be included in the coverage range of each network device 110, which is not limited by the embodiment of the disclosure.

Optionally, the communication system 100 may further include other network entities such as a network controller and a mobility management entity, which are not limited by the embodiment of the disclosure.

It should be understood that a device with a communication function in a network/system in the embodiment of the disclosure may be referred to as a communication device. Taking the communication system 100 shown in FIG. 1 as an example, the communication device may include the network device 110 and the terminal device 120 with communication functions. The network device 110 and the terminal device 120 may be the specific devices described above, which will not be repeated here. The communication device may further include other devices in the communication system 100, such as other network entities such as a network controller and a mobility management entity, which are not limited by the embodiment of the disclosure.

It should be understood that the terms "system" and "network" in the disclosure are often used interchangeably. The term "and/or" in the disclosure is only used to describe an association relationship of associated objects, which represents that there may be three types of relationships. For example, A and/or B may represent the three situations that A exists alone, A and B exist at the same time, and B exists alone. In addition, the sign "/" in the disclosure generally represents that the previous and next associated objects are in an "or" relationship.

The embodiments of the disclosure describe various embodiments in combination with a terminal device and a network device. The terminal device may also be referred to as a user equipment (UE), an access terminal, a user unit, a user station, a mobile station, a remote station, a remote terminal, a mobile device, a user terminal, a terminal, a wireless communication device, a user agent, a user apparatus, etc. The terminal device may be a station (ST) in a WLAN, a cellular phone, a cordless phone, a session initiation protocol (SIP) phone, a wireless local loop (WLL)

station, a personal digital assistant (PDA) device, a handheld device with a wireless communication function, a computing device, other processing devices connected to a wireless modulator-demodulator, an on-board device, a wearable device, and a next-generation communication system, such as a terminal device in an NR network or a terminal device in the future evolution of a public land mobile network (PLMN).

As an example and not a limitation, in the embodiment of the disclosure, the terminal device may also be a wearable device. The wearable device may also be referred to as a wearable smart device, which is a general term for a wearable device developed by applying wearable technology to intelligently design daily wear, such as glasses, gloves, watches, clothing, and shoes. The wearable device is a portable device that is directly worn on the body or integrated into clothes or accessories of the user. The wearable device is not only a hardware device, but also implements powerful functions through software support, data interaction, and cloud interaction. In a broad sense, the wearable smart device includes, for example, a smart watch, smart glasses, etc., that is full-featured, large-sized, may implement complete or partial functions without relying on smart phones, and various smart bracelets, smart jewelries, etc. for monitoring physical signs that only focus on a certain type of application function and need to be used in cooperation with other devices such as smart phones.

The network device may be a device used to communicate with a mobile device. The network device may be an access point (AP) in WLAN, a base transceiver station (BTS) in GSM or CDMA, a node B (NB) in WCDMA, an evolutional node B (eNB or eNodeB) in LTE, a relay station, an access point, an on-board device, a wearable device, a network device or a generation node B (gNB) in an NR network, a network device in the future evolution of a PLMN, etc.

In the embodiment of the disclosure, the network device provides services for a cell. The terminal device communicates with the network device through a transmission resource (for example, a frequency domain resource or a spectrum resource) used by the cell. The cell may be a cell corresponding to the network device (for example, a base station). The cell may belong to a macro base station or a base station corresponding to a small cell. The small cell may include a metrocell, a microcell, a picocell, a femtocell, etc. The small cells have the characteristics of small coverage range and low emission power and are suitable for providing high-speed data transmission services.

Figure 2:
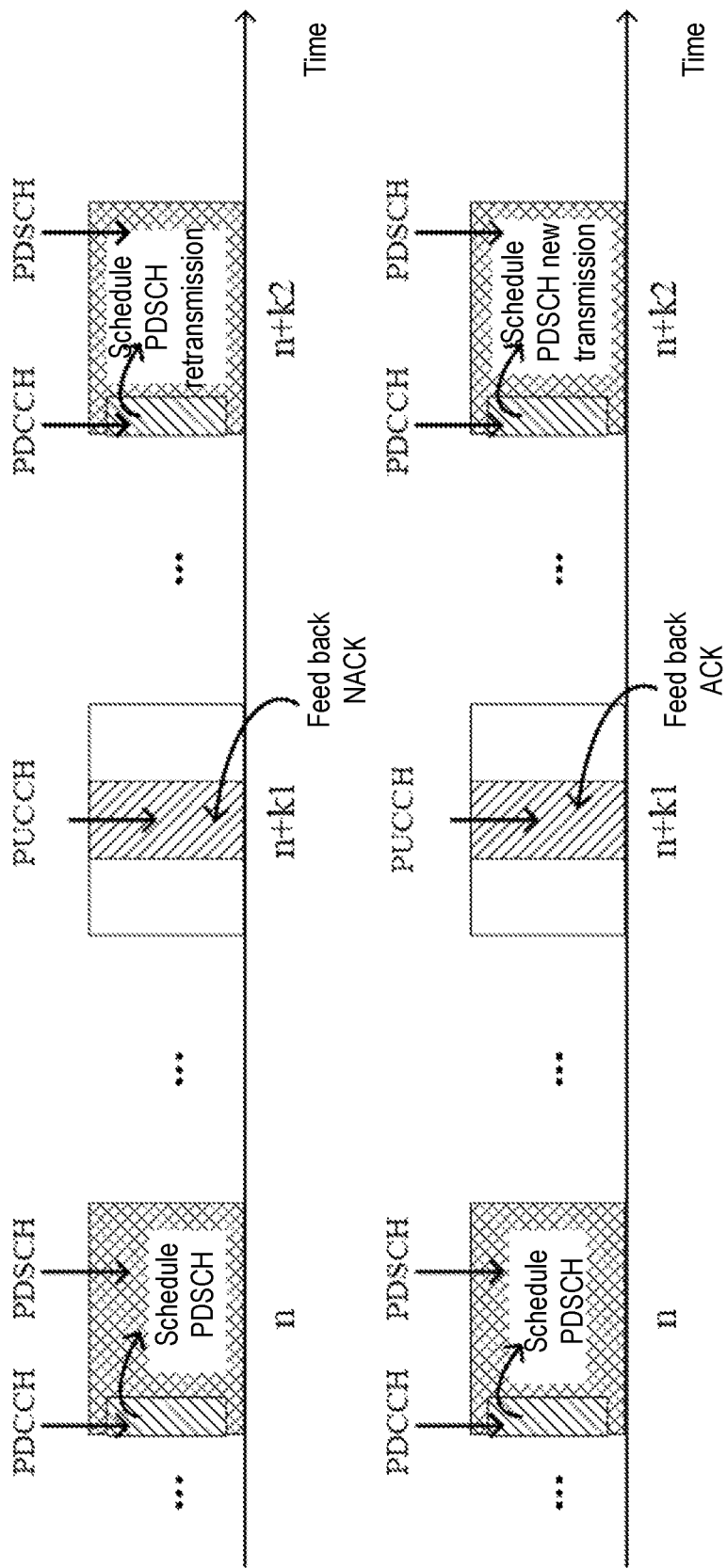
FIG. 2 is a schematic diagram of a unicast PDSCH transmission process according to the disclosure.

It should be understood that a unicast physical downlink shared channel (PDSCH) transmission process in an NR system may be as shown in FIG. 2.

The network device sends a physical downlink control channel (PDCCH) and the PDSCH during a certain HARQ process scheduled by the PDCCH to the terminal device in a time slot n. The PDSCH is used to transmit at least one transmission block. The PDCCH may further include instruction information for the terminal device to transmit HARQ feedback corresponding to the PDSCH, such as physical uplink control channel (PUCCH) resource instruction information, downlink assignment index (DAI) information, PUCCH power control command words, PDSCH-to-HARQ feedback time instruction, etc.

After correctly receiving the PDCCH, the terminal device receives the corresponding PDSCH according to scheduling information of the PDSCH included in the PDCCH.

If the terminal device does not correctly receive the PDSCH, the terminal device feeds back negative acknowledgement (NACK) information to the network device on a PUCCH resource (for example, a time slot n+k1 in FIG. 2) determined according to the PDCCH. After receiving the NACK information fed back by the terminal device, the network device may use the same HARQ process on a subsequent time resource (for example, a time slot n+k2 in FIG. 2) to send a retransmission of the transmission block in the PDSCH to the terminal device.

If the terminal device correctly receives the PDSCH, the terminal device feeds back acknowledgement (ACK) information to the network device on the PUCCH resource (for example, the time slot n+k1 in FIG. 2) determined according to the PDCCH. After receiving the ACK information fed back by the terminal device, the network device may use the same HARQ process on the subsequent time resource (for example, the time slot n+k2 in FIG. 2) to send a new transmission of another PDSCH (that is, a new transmission block) to the terminal device.

With the development of wireless communication technology, the sending-end device may adopt broadcast or multicast to transmit data information to multiple receiving-end devices, and the sending-end device needs to know whether the receiving-end devices correctly receive the data information. For example, during a transmission process of a vehicle to everything (V2X), the vehicle (the sending-end device) needs to notify multiple surrounding vehicles (the receiving-end device) of its location, speed, vehicle information, and other parameters in time. For another example, in a wireless high-definition television service, high-definition television content needs to be transmitted to multiple television receiving users in time. Therefore, a new requirement has emerged, that is, for a wireless communication process of performing the same data channel reception on multiple receiving-end devices such as broadcast or multicast, a HARQ transmission process also needs to be considered. However, how to design such acknowledgement feedback based on multiple receiving-end devices is an issue that needs to be considered.

Based on the above technical issues, the embodiment of the disclosure provides a wireless communication method for a wireless communication process of performing the same data channel reception on multiple receiving-end devices such as broadcast or multicast, and HARQ transmission may also be implemented.

The wireless communication solutions designed by the disclosure in response to the above technical issues are described in detail below.

Figure 3:
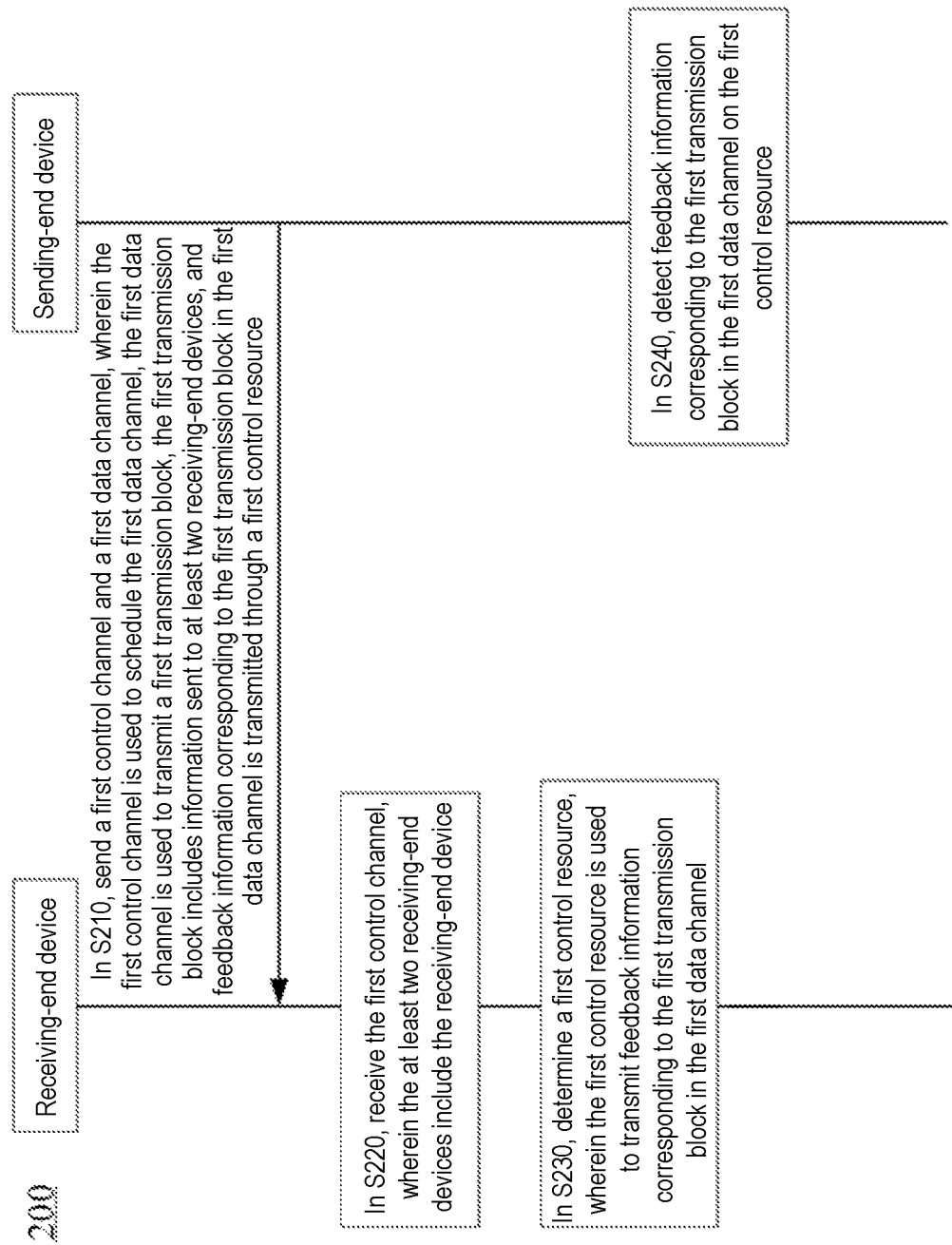
FIG. 3 is a schematic flowchart of a wireless communication method according to an embodiment of the disclosure.

FIG. 3 is a schematic flowchart of a wireless communication method 200 according to an embodiment of the disclosure. As shown in FIG. 3, the method 200 may include some or all of the following content.

In S210, a sending-end device sends a first control channel and a first data channel to at least two receiving-end devices. The first control channel is used to schedule the first data channel. The first data channel is used to transmit a first transmission block. The first transmission block includes information sent to the at least two receiving-end devices. Feedback information corresponding to the first transmission block in the first data channel is transmitted through a first control resource.

In S220, a receiving-end device receives the first control channel sent by the sending-end device. The at least two receiving-end devices include the receiving-end device.

In S230, the receiving-end device determines the first control resource. The first control resource is used to transmit the feedback information corresponding to the first transmission block in the first data channel.

In S240, the sending-end device detects the feedback information corresponding to the first transmission block in the first data channel on the first control resource.

In the embodiment of the disclosure, the receiving-end device may monitor the first data channel according to the first control channel, and after determining the first control resource, the receiving-end device may transmit the feedback information corresponding to the first transmission block in the first data channel on the first control resource based on a monitoring result of the first data channel.

Optionally, in the embodiment of the disclosure, a control channel may be a physical downlink control channel (PDCCH) or a physical sidelink control channel (PSCCH). A data channel may be a physical downlink shared channel (PDSCH) or a physical sidelink shared channel (PSSCH).

Optionally, in the embodiment of the disclosure, the method 200 may be applied to at least one of device to device (D2D) communication, vehicle to vehicle (V2V) communication, vehicle to everything (V2X) communication, machine to machine (M2M) communication, cellular network communication, machine type communication (MTC), etc.

Optionally, in the embodiment of the disclosure, the sending-end device may be a network device or a terminal device, and the receiving-end device may also be a network device or a terminal device.

Optionally, the sending-end device includes a network device, the receiving-end device includes a terminal device, the control channel includes PDCCH, and a control resource includes a resource in a physical uplink control channel (PDCCH) or a resource in a physical uplink shared channel (PUSCH).

Optionally, the sending-end device includes a terminal device, the receiving-end device includes a terminal device, the control channel includes PSCCH, and the control resource includes a resource in PSCCH, a resource in PSSCH, or other resources for sending the feedback information.

Optionally, the sending-end device may send the first control channel and the first data channel to the at least two receiving-end devices through broadcast or multicast.

Optionally, in the embodiment of the disclosure, the first control channel includes first instruction information. The first instruction information is used by the receiving-end device to determine the first control resource. That is, the receiving-end device may determine the first control resource according to the first instruction information. Similarly, the other one receiving-end device of the at least two receiving-end devices may also determine the first control resource according to the first instruction information.

It should be understood that the control channel including the instruction information may indicate that control information transmitted on the control channel includes the instruction information; or may also mean that the control channel carries the instruction information during a transmission process, which is not limited by the disclosure.

Optionally, in the embodiment of the disclosure, the first control channel includes second instruction information.

The second instruction information is used to instruct that the first transmission block in the first data channel is newly transmitted data, and/or the second instruction information is used to instruct a redundancy version corresponding to the first transmission block in the first data channel.

Optionally, in the embodiment of the disclosure, as Example 1, the first control resource includes a first feedback channel resource. The first feedback channel resource is used to transmit NACK information corresponding to the first transmission block in the first data channel.

Optionally, when the receiving-end device does not correctly receive the first data channel, the receiving-end device transmits the NACK information corresponding to the first transmission block in the first data channel on the first feedback channel resource; and/or when the receiving-end device correctly receives the first data channel, the receiving-end device does not perform HARQ feedback on the first feedback channel resource.

That is, when the receiving-end device correctly receives the first data channel, the receiving-end device does not feed back ACK information.

Optionally, in Example 1, when multiple receiving-end devices do not correctly receive the first data channel, the receiving-end devices transmit the same NACK information on the first feedback channel resource; and/or when multiple receiving-end devices correctly receive the first data channel, the receiving-end devices do not perform HARQ feedback on the first feedback channel resource.

Optionally, in Example 1, when multiple receiving-end devices do not correctly receive the first data channel, the receiving-end devices transmit the same NACK information at the same resource location (such as the same time domain, frequency domain, code domain, space domain) in the first feedback channel resource. That is, the NACK information does not contain identification information of the corresponding receiving-end device.

Optionally, in Example 1, the sending-end device detects the feedback information on the first feedback channel resource. If the sending-end device detects the NACK information on the first feedback channel resource, the sending-end device assumes that at least one of the receiving-end devices does not correctly receive the first data channel; and/or if the sending-end device does not detect the NACK information on the first feedback channel resource, the sending-end device assumes that at least one of the receiving-end devices correctly receives the first data channel.

Optionally, when the first control channel includes the instruction information for determining the first control resource, if the sending-end device does not detect the NACK information on the first feedback channel resource, considering that there may be a receiving-end device that does not receive the first control channel, the sending-end device may assume that all of the receiving-end devices that receive the first control channel correctly receive the first data channel. Further optionally, if the code rate of information transmitted on the first control channel is very low, under this situation, the sending-end device may assume that all of the receiving-end devices correctly receive the first control channel and the first data channel.

Optionally, in the embodiment of the disclosure, as Example 2, the first control resource includes the first feedback channel resource and a second feedback channel resource. The first feedback channel resource is used to transmit the ACK information corresponding to the first transmission block in the first data channel. The second feedback channel resource is used to transmit the NACK information corresponding to the first transmission block in the first data channel.

Optionally, at least one of time domain resources, frequency domain resources, code domain resources, and space domain resources corresponding to the first feedback channel resource and the second feedback channel resource are different.

Optionally, when the receiving-end device correctly receives the first data channel, the receiving-end device transmits the ACK information corresponding to the first transmission block in the first data channel on the first feedback channel resource; and/or when the receiving-end device does not receive the first data channel, the receiving-end device transmits the NACK information corresponding to the first transmission block in the first data channel on the second feedback channel resource.

Optionally, in Example 2, when the receiving-end devices correctly receive the first data channel, the receiving-end devices transmit the same ACK information on the first feedback channel resource; and/or when the receiving-end devices do not correctly receive the first data channel, the receiving-end devices transmit the same NACK information on the second feedback channel resource.

Optionally, in Example 2, the sending-end device detects the feedback information on the first feedback channel resource, and if the sending-end device detects the ACK information on the first feedback channel resource, the sending-end device assumes that at least one of the receiving-end devices correctly receives the first data channel; and/or the sending-end device detects the feedback information on the second feedback channel resource, and if the sending-end device detects the NACK information on the second feedback channel resource, the sending-end device assumes that at least one of the receiving-end devices does not correctly receive the first data channel.

Optionally, in the embodiment of the disclosure, as Example 3, the first control resource includes at least two feedback channel resources. The at least two feedback channel resources correspond one-to-one to the at least two receiving-end devices.

It should be noted that each feedback channel resource of the at least two feedback channel resources is used by the corresponding receiving-end device to transmit the ACK information or the NACK information corresponding to the first transmission block in the first data channel.

In Example 3, the receiving-end device may determine the first feedback channel resource corresponding to the receiving-end device from the at least two feedback channel resources.

Optionally, the receiving-end device determines the first feedback channel resource corresponding to the receiving-end device from the at least two feedback channel resources according to first configuration information sent by the sending-end device. Correspondingly, the sending-end device sends the first configuration information to the at least two receiving-end devices. The first configuration information is used by the receiving-end device in the at least two receiving-end devices to determine the corresponding feedback channel resource.

Optionally, the receiving-end device determines location information of the receiving-end device in a first device group according to the first configuration information sent by the sending-end device, and determines the first feedback channel resource corresponding to the receiving-end device according to the location information. The first device group includes the at least two receiving-end devices. Correspondingly, the sending-end device sends the first configuration information to the at least two receiving-end devices. The first configuration information is used by the receiving-end device in the at least two receiving-end devices to determine its location information in the first device group and is used by the receiving-end device in the at least two receiving-end devices to determine its corresponding feedback channel resource according to the determined location information. The first device group includes the at least two receiving-end devices.

Optionally, the first configuration information is high-level signaling and the first instruction information is physical layer signaling. The receiving-end device jointly determines the first feedback channel resource corresponding to the receiving-end device according to the first configuration information and the first instruction information.

Optionally, when the receiving-end device correctly receives the first data channel, the receiving-end device transmits the ACK information corresponding to the first transmission block in the first data channel on the first feedback channel resource.

When the receiving-end device does not correctly receive the first data channel, the receiving-end device transmits the NACK information corresponding to the first transmission block in the first data channel on the first feedback channel resource.

Optionally, in Example 3, at least one of time domain resources, frequency domain resources, code domain resources, and space domain resources corresponding to any two of the at least two feedback channel resources are different.

Optionally, in Example 3, when the receiving-end device transmits the ACK information or the NACK information corresponding to the first transmission block in the first data channel on the first feedback channel resource, the identification information of the receiving-end device is carried.

Optionally, in Example 3, the sending-end device detects the feedback information on the first feedback channel resource. If the sending-end device detects the ACK information on the first feedback channel resource, the sending-end device may consider that the receiving-end device correctly receives the first data channel; if the sending-end device detects the NACK information on the first feedback channel resource, the sending-end device may consider that the receiving-end device does not correctly receive the first data channel; and/or if the sending-end device does not detect any information on the first feedback channel resource, the sending-end device may consider that the receiving-end device does not correctly receive the first control channel and does not correctly receive the first data channel.

Optionally, in the embodiment of the disclosure, as Example 4, the first control resource includes the first feedback channel resource. The first feedback channel resource is used to transmit the ACK information corresponding to the first transmission block in the first data channel.

Optionally, when the receiving-end device correctly receives the first data channel, the receiving-end device transmits the ACK information corresponding to the first transmission block in the first data channel on the first feedback channel resource; and/or when the receiving-end device does not correctly receive the first data channel, the receiving-end device does not perform HARQ feedback on the first feedback channel resource.

That is, when the receiving-end device does not correctly receive the first data channel, the receiving-end device does not feed back the NACK information.

Optionally, in Example 4, when the receiving-end devices correctly receive the first data channel, the receiving-end devices transmit the same ACK information on the first feedback channel resource; and/or when the receiving-end devices do not correctly receive the first data channel, the receiving-end devices do not perform HARQ feedback on the first feedback channel resource.

Optionally, in Example 4, when the receiving-end devices do not correctly receive the first data channel, the receiving-end devices transmit the same ACK information at the same resource location (such as the same time domain, frequency domain, code domain, space domain) in the first feedback channel resource. That is, the ACK information does not contain the identification information of the corresponding receiving-end device.

Optionally, in Example 4, the sending-end device detects the feedback information on the first feedback channel resource. If the sending-end device detects the ACK information on the first feedback channel resource, the sending-end device assumes that at least one of the receiving-end devices correctly receives the first data channel; and/or if the sending-end device does not detect the ACK information on the first feedback channel resource, the sending-end device assumes that all of the receiving-end devices do not correctly receive the first data channel.

Optionally, if the sending-end device detects that the signal energy of the ACK information on the first feedback channel resource does not exceed a preset threshold, the sending-end device may assume that at least some of the receiving-end devices do not correctly receive the first data channel. Therefore, the sending-end device retransmits the first transmission block transmitted on the first data channel. Optionally, if the sending-end device detects that the signal energy of the ACK information on the first feedback channel resource exceeds the preset threshold, the sending-end device does not retransmit the first transmission block transmitted on the first data channel.

Optionally, in the embodiment of the disclosure, when the sending-end device detects the NACK information on the first control resource, when the signal energy of the ACK information detected by the sending-end device on the first control resource does not exceed the preset threshold, or when the sending-end device assumes or considers that at least one of the receiving-end devices does not correctly receive the first data channel, the sending-end device sends a second control channel and a second data channel to the at least two receiving-end devices. The second control channel is used to schedule the second data channel. The second control channel includes third instruction information. The third instruction information instructs the second data channel for retransmitting the first transmission block. It should be noted that the NACK information may be transmitted by any one or more of the at least two receiving-end devices on the first control resource. The ACK information may also be transmitted by any one or more of the at least two receiving-end devices on the first control resource.

Optionally, the receiving-end device transmits the NACK information corresponding to the first transmission block through the first control resource.

The receiving-end device receives the second control channel sent by the sending-end device. The second control channel is used to schedule the second data channel. The second control channel includes the third instruction information. The third instruction information instructs the second data channel for retransmitting the first transmission block.

The receiving-end device determines a second control resource. The second control resource is used to transmit the feedback information corresponding to the first transmission block in the second data channel.

Optionally, the third instruction information is further used to instruct the redundancy version corresponding to the first transmission block in the second data channel.

Optionally, the second control channel includes fourth instruction information. The fourth instruction information is used by the receiving-end device to determine the second control resource. That is, the receiving-end device may determine the second control resource according to the fourth instruction information. Similarly, the other receiving-end device of the at least two receiving-end devices may also determine the second control resource according to the fourth instruction information.

Optionally, the receiving-end device jointly determines the second control resource according to the first configuration information and the fourth instruction information.

Optionally, in the embodiment of the disclosure, the receiving-end device successfully receives the first data channel.

The receiving-end device receives the second control channel sent by the sending-end device. The second control channel is used to schedule the second data channel. The second control channel includes the third instruction information. The third instruction information instructs the second data channel for retransmitting the first transmission block.

The receiving-end device does not receive the second data channel.

In other words, when the receiving-end device successfully receives the first data channel and the other receiving-end devices in the at least two receiving-end devices does not successfully receive the first data channel, the receiving-end device receives the second control channel sent by the sending-end device. After determining the second data channel scheduled by the second control channel for retransmitting the first transmission block, the second data channel may not be received. Thus, the processing complexity of the receiving-end device is reduced and the power consumption is saved.

It should be noted that when the transmission block transmitted in one data channel includes data of multiple receiving-end devices, and the data channel corresponds to one feedback resource, if some of the receiving-end devices correctly receive the data of the data channel and feed back the ACK information on the feedback resource, and some of the receiving-end devices do not correctly receive the data of the data channel and feed back the NACK information on the feedback resource, then the ACK information and the NACK information are both on the feedback resource, and the sending-end device cannot judge whether information sent on the feedback resource is the ACK information or the NACK information. Based on the solution in the disclosure, such situation may be avoided. Specifically, when the sending-end device transmits data to at least two receiving-end devices, the at least two receiving-end devices may implement acknowledgement feedback and may implement HARQ transmission.

Optionally, the wireless communication method 200 is described in detail in the following three embodiments, which are specifically exemplified with the sending-end device being a network device and the receiving-end device being a terminal device (UE).

Figure 4:
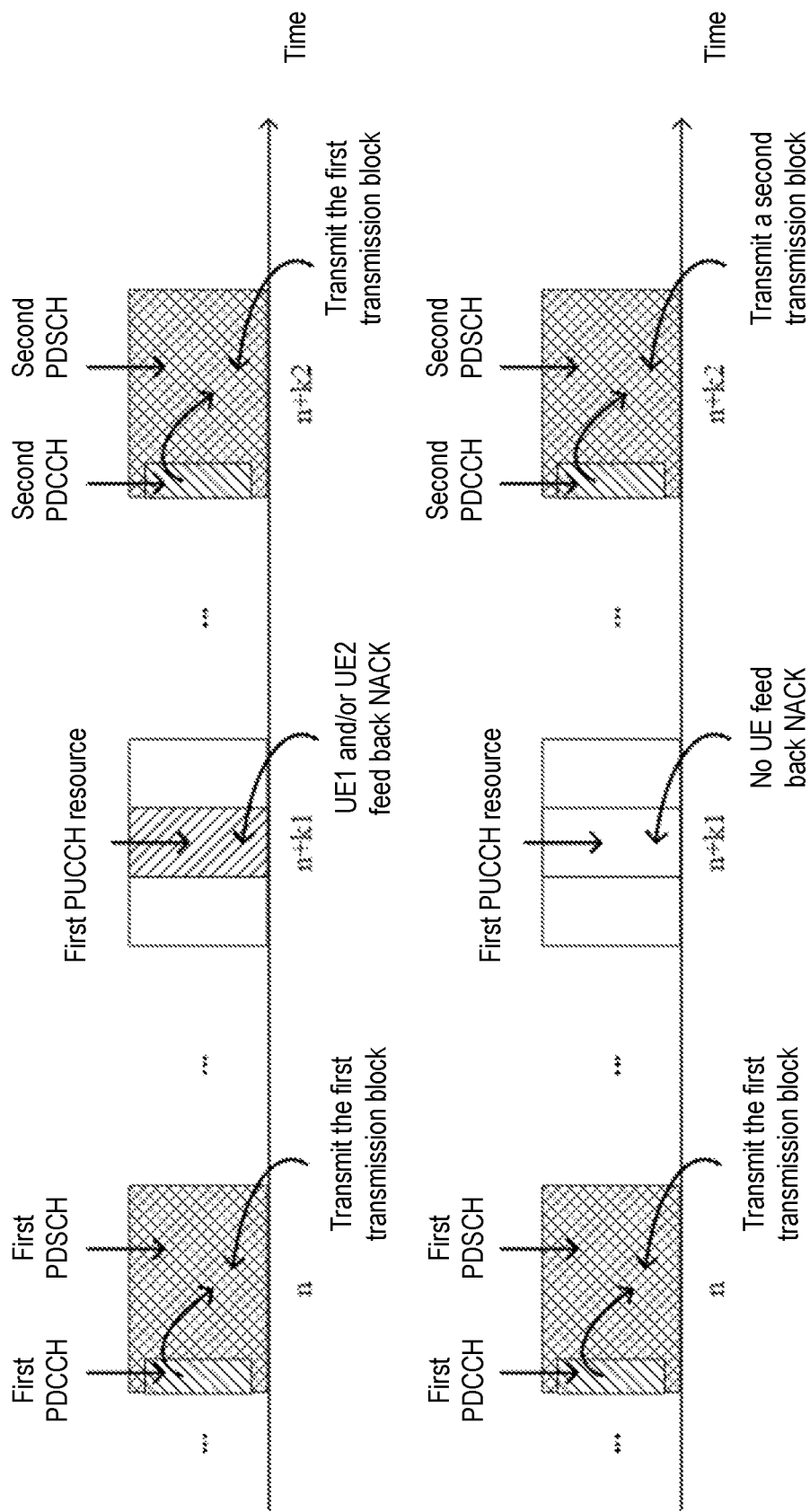
FIG. 4 is a schematic diagram of a PDSCH transmission process according to an embodiment of the disclosure.

Optionally, FIG. 4 shows Embodiment 1.

A network device sends a first PDCCH and a first PDSCH to UE1 and UE2 in a time slot n. The first PDSCH is used to transmit a first transmission block. In addition to scheduling information of the first PDSCH, the first PDCCH further includes first instruction information. The first instruction information is used to determine a first PUCCH resource (time slot n+k1). The instruction information includes at least one of DAI information, PUCCH power control command words, PUCCH resource instruction information, PDSCH-to-HARQ feedback time instruction information, etc. The first PUCCH resource is used to transmit feedback information corresponding to the first PDSCH.

Assuming that UE1 and UE2 do not successfully receive the first PDSCH, then UE1 and UE2 both send NACK feedback information on the first PUCCH resource. Further, if after the time slot n+k1, UE1 and UE2 detect a second PDCCH, and a second PDSCH scheduled by the second PDCCH is used to transmit a retransmission of the first transmission block, then UE1 and UE2 need to perform corresponding feedback according to the reception situation of the second PDSCH.

Assuming that UE1 successfully receives the first PDSCH and UE2 does not successfully receive the first PDSCH, then UE1 does not send the feedback information on the first PUCCH resource, and UE2 sends the NACK feedback information on the first PUCCH resource. Further, if after the time slot n+k1, UE1 and UE2 detect the second PDCCH (for example, detect the second PDCCH in a time slot n+k2), and the second PDSCH scheduled by the second PDCCH is used to transmit the retransmission of the first transmission block, then UE1 does not need to perform the reception and feedback of the second PDSCH, and the UE2 needs to perform corresponding feedback according to the reception situation of the second PDSCH.

Assuming that UE1 and UE2 both successfully receive the first PDSCH, then UE1 and UE2 both do not send the feedback information on the first PUCCH resource. Further, if after the time slot n+k1, UE1 and/or UE2 detect the second PDCCH (for example, detect the second PDCCH in the time slot n+k2), and the second PDSCH scheduled by the second PDCCH is used to transmit a new transmission of a second transmission block, then UE1 and/or UE2 need to perform the reception and feedback of the second PDSCH.

In Embodiment 1, if the network device detects the NACK information on the first PUCCH resource, the network device may retransmit the first transmission block in the first PDSCH.

Figure 5:
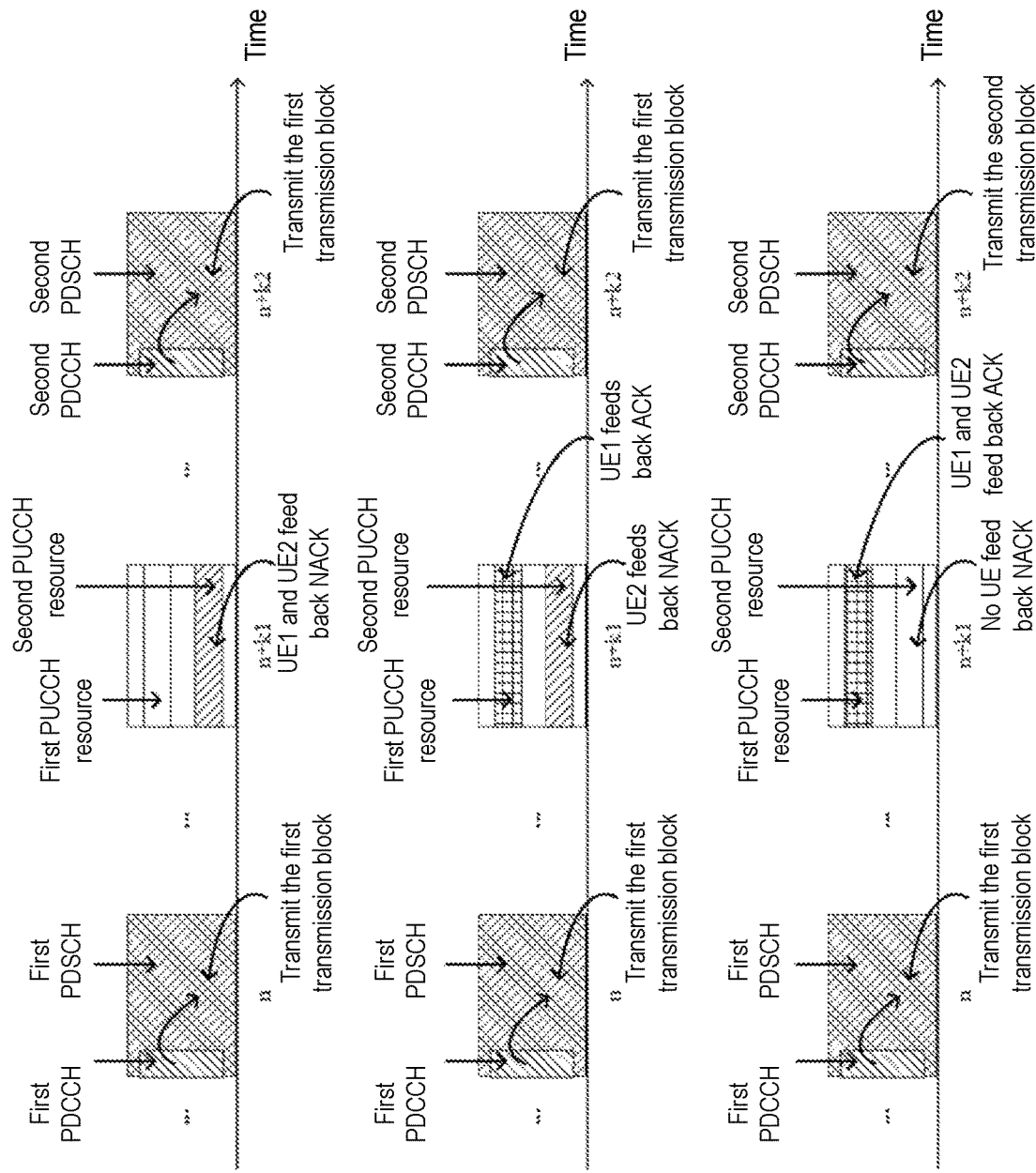
FIG. 5 is a schematic diagram of another PDSCH transmission process according to an embodiment of the disclosure.

Optionally, FIG. 5 shows Embodiment 2.

A network device sends a first PDCCH and a first PDSCH to UE1 and UE2 in a time slot n. The first PDSCH is used to transmit a first transmission block. In addition to scheduling information of the first PDSCH, the first PDCCH further includes first instruction information. The first instruction information is used to determine a first PUCCH resource and a second PUCCH resource (time slot n+k1). The first instruction information includes at least one of DAI information, PUCCH power control command words, PUCCH resource instruction information, PDSCH-to-HARQ feedback time instruction information, etc. The first PUCCH resource is used to transmit ACK feedback information (may also be referred to as an ACK channel resource) corresponding to the first PDSCH. The second PUCCH resource is used to transmit NACK feedback information (may also be referred to as a NACK channel resource) corresponding to the first PDSCH.

Assuming that UE1 and UE2 do not successfully receive the first PDSCH, then both UE1 and UE2 send the NACK feedback information on the second PUCCH resource. Further, if after the time slot n+k1, UE1 and UE2 detect a second PDCCH, and a second PDSCH scheduled by the second PDCCH is used to transmit a retransmission of the first transmission block, then UE1 and UE2 need to perform corresponding feedback according to the reception situation of the second PDSCH.

Assuming that UE1 successfully receives the first PDSCH and UE2 does not successfully receive the first PDSCH, then UE1 sends the ACK feedback information on the first PUCCH resource, and UE2 sends the NACK feedback information on the second PUCCH resource. Further, if after the time slot n+k1, UE1 and UE2 detect the second PDCCH (for example, detect the second PDCCH in a time slot n+k2), and the second PDSCH scheduled by the second PDCCH is used to transmit the retransmission of the first transmission block, then UE1 does not need to perform the reception and feedback of the second PDSCH, and UE2 needs to perform corresponding feedback according to the reception situation of the second PDSCH.

Assuming that UE1 and UE2 both successfully receive the first PDSCH, UE1 and UE2 both send the ACK feedback information on the first PUCCH resource. Further, if after the time slot n+k1, UE1 and/or UE2 detect the second PDCCH (for example, detect the second PDCCH in the time slot n+k2), and the second PDSCH scheduled by the second PDCCH is used to transmit a new transmission of a second transmission block, then UE1 and/or UE2 need to perform the reception and feedback of the second PDSCH.

In Embodiment 2, if the network device detects the NACK information on the second PUCCH resource, the network device may retransmit the first transmission block in the first PDSCH.

Figure 6:
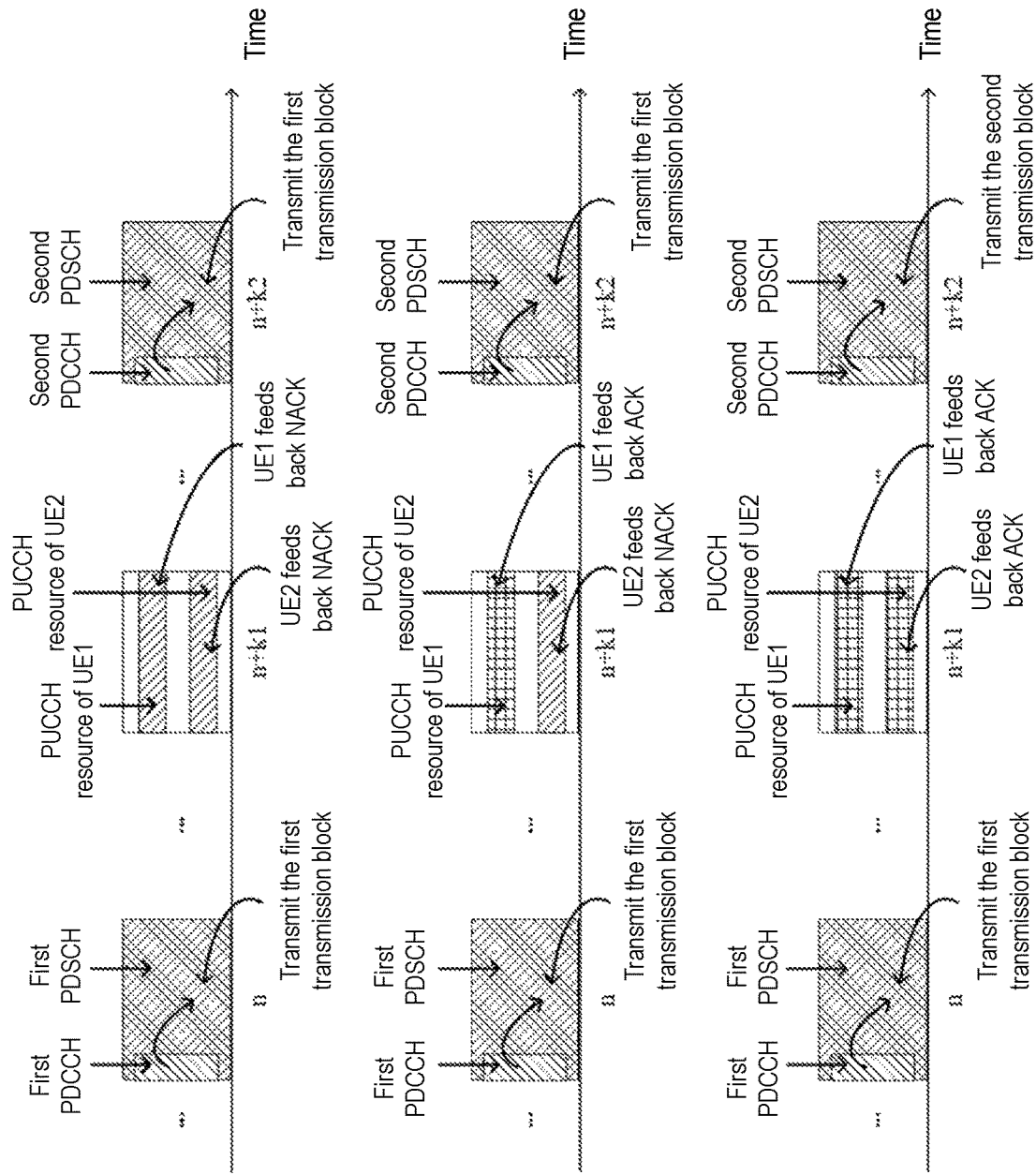
FIG. 6 is a schematic diagram of yet another PDSCH transmission process according to an embodiment of the disclosure.

Optionally, FIG. 6 shows Embodiment 3.

A network device determines to perform multicast communication with UE1 and UE2, so the network device preconfigures UE1 and UE2 as a group, denoted as a group A, and UE1 is a first UE in the group A and UE2 is a second UE in the group A. The network device notifies UE1 and UE2 of the preconfiguration information.

The network device sends a first PDCCH and a first PDSCH to UE1 and UE2 in a time slot n. The first PDSCH is used to transmit a first transmission block. In addition to scheduling information of the first PDSCH, the first PDCCH further includes first instruction information. The first instruction information is used to determine a PUCCH resource of UE1 and a PUCCH resource of UE2 (time slot n+k1). For example, the first instruction information includes at least one of DAI information, PUCCH power control command words, PUCCH resource instruction information, PDSCH-to-HARQ feedback time instruction information, etc.

After determining the PUCCH resource of UE1 and the PUCCH resource of UE2 according to the first instruction information, UE1 determines the PUCCH resource of UE1 in the two PUCCH resources, for example, the PUCCH resource of UE1, as its own resource for transmitting feedback information according to its location in the group A. UE2 determines the PUCCH resource of UE2 in the two PUCCH resources, for example, the PUCCH resource of UE2, as its own resource for transmitting the feedback information according to its location in the group A.

Assuming that UE1 successfully receives the first PDSCH, then UE1 feeds back ACK information on the PUCCH resource of UE1. Assuming that UE1 does not successfully receive the first PDSCH, then UE1 feeds back NACK information on the PUCCH resource of UE1. Further, if UE1 successfully receives the first PDSCH, when UE1 detects a second PDCCH, and a second PDSCH scheduled by the second PDCCH is used to transmit a retransmission of the first transmission block, UE1 does not need to receive the second PDSCH. Accordingly, since UE1 also does not need to perform feedback for the second PDSCH, instruction information used to instruct the PUCCH resource of UE1 in the second PDCCH may be occupancy information. If UE1 does not successfully receive the first PDSCH, then for the second PDSCH retransmitting the first transmission block, UE1 needs to receive the second PDSCH. If UE1 detects the second PDCCH, and the second PDSCH scheduled by the second PDCCH is used to transmit a new transmission of a second transmission block, UE1 needs to receive the second PDSCH.

Assuming that UE2 successfully receives the first PDSCH, then UE2 feeds back the ACK information on the PUCCH resource of UE2. Assuming that UE2 does not successfully receive the first PDSCH, then UE2 feeds back the NACK information on the PUCCH resource of UE2. Further, if UE2 successfully receives the first PDSCH, when UE2 detects the second PDCCH, and the second PDSCH scheduled by the second PDCCH is used to transmit the retransmission of the first transmission block, UE2 does not need to receive the second PDSCH. Accordingly, since UE2 also does not need to perform feedback for the second PDSCH, the instruction information used to instruct the PUCCH resource of UE2 in the second PDCCH may be the occupancy information. If UE2 does not successfully receive the first PDSCH, then for the second PDSCH retransmitting the first transmission block, UE2 needs to receive the second PDSCH. If UE2 detects the second PDCCH, and the second PDSCH scheduled by the second PDCCH is used to transmit the new transmission of the second transmission block, UE2 needs to receive the second PDSCH.

In Embodiment 3, if at least one of the first PUCCH resource and the second PUCCH resource transmits the NACK information, the network device may retransmit the first transmission block in the first PDSCH.

Therefore, in the embodiment of the disclosure, the sending-end device sends the first control channel and the first data channel to the at least two receiving-end devices, and the at least two receiving-end devices may implement the acknowledgement feedback for the first transmission block transmitted in the first data channel on the first control resource, thereby implementing the acknowledgement feedback of the receiving-end devices for the same data to improve the user experience.

Figure 7:
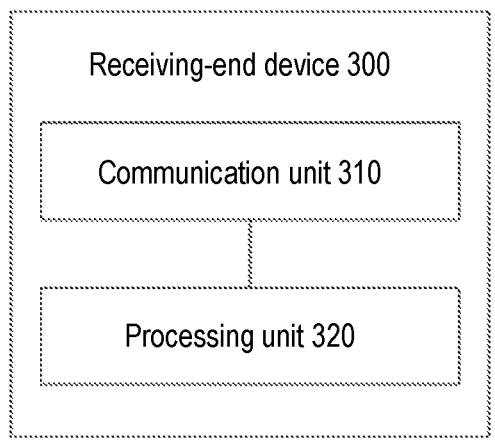
FIG. 7 is a schematic block diagram of a receiving-end device according to an embodiment of the disclosure.

FIG. 7 shows a schematic block diagram of a receiving-end device 300 according to an embodiment of the disclosure. As shown in FIG. 7, the receiving-end device 300 includes the following.

A communication unit 310 is used to receive a first control channel sent by a sending-end device. The first control channel is used to schedule a first data channel. The first data channel is used to transmit a first transmission block. The first transmission block includes information sent to at least two receiving-end devices. The at least two receiving-end devices include the receiving-end device.

A processing unit 320 is used to determine a first control resource. The first control resource is used to transmit feedback information corresponding to the first transmission block in the first data channel.

Optionally, the first control channel includes first instruction information. The first instruction information is used by the receiving-end device to determine the first control resource.

Optionally, the first control resource includes a first feedback channel resource. The first feedback channel resource is used to transmit NACK information corresponding to the first transmission block in the first data channel.

Optionally, when the receiving-end device 300 does not correctly receive the first data channel, the communication unit 310 is further used to transmit the NACK information corresponding to the first transmission block in the first data channel on the first feedback channel resource; and/or when the receiving-end device 300 correctly receives the first data channel, the communication unit 310 is further used to not perform HARQ feedback on the first feedback channel resource.

Optionally, when multiple receiving-end devices do not correctly receive the first data channel, the receiving-end devices transmit the same NACK information on the first feedback channel resource; and/or when the receiving-end devices correctly receive the first data channel, the receiving-end devices do not perform HARQ feedback on the first feedback channel resource.

Optionally, the first control resource includes the first feedback channel resource and a second feedback channel resource. The first feedback channel resource is used to transmit the ACK information corresponding to the first transmission block in the first data channel. The second feedback channel resource is used to transmit the NACK information corresponding to the first transmission block in the first data channel.

Optionally, at least one of time domain resources, frequency domain resources, code domain resources, and space domain resources corresponding to the first feedback channel resource and the second feedback channel resource are different.

Optionally, when the receiving-end device 300 correctly receives the first data channel, the communication unit 310 is further used to transmit the ACK information corresponding to the first transmission block in the first data channel on the first feedback channel resource; and/or when the receiving-end device 300 does not receive the first data channel, the communication unit 310 is further used to transmit the NACK information corresponding to the first transmission block in the first data channel on the second feedback channel resource.

Optionally, when multiple receiving-end devices correctly receive the first data channel, the receiving-end devices transmit the same ACK information on the first feedback channel resource; and/or when the receiving-end devices do not correctly receive the first data channel, the receiving-end devices transmit the same NACK information on the second feedback channel resource.

Optionally, the first control resource includes at least two feedback channel resources. The at least two feedback channel resources correspond one-to-one to the at least two receiving-end devices.

The processing unit 320 is further used to determine the first feedback channel resource corresponding to the receiving-end device from the at least two feedback channel resources.

Optionally, at least one of time domain resources, frequency domain resources, code domain resources, and space domain resources corresponding to any two of the at least two feedback channel resources are different.

Optionally, the processing unit 320 is specifically used to do the following.

The first feedback channel resource corresponding to the receiving-end device is determined from the at least two feedback channel resources according to first configuration information sent by the sending-end device.

Optionally, the processing unit 320 is specifically used to do the following.

Location information of the receiving-end device in a first device group is determined according to the first configuration information sent by the sending-end device, and the first feedback channel resource corresponding to the receiving-end device is determined according to the location information. The first device group includes the at least two receiving-end devices.

Optionally, when the receiving-end device 300 correctly receives the first data channel, the communication unit 310 is further used to transmit the ACK information corresponding to the first transmission block in the first data channel on the first feedback channel resource; and/or when the receiving-end device 300 does not correctly receive the first data channel, the communication unit 310 is further used to transmit the NACK information corresponding to the first transmission block in the first data channel on the first feedback channel resource.

Optionally, the first control channel includes second instruction information.

The second instruction information is used to instruct that the first transmission block in the first data channel is newly transmitted data, and/or, the second instruction information is used to instruct a redundancy version corresponding to the first transmission block in the first data channel.

Optionally, the communication unit 310 is further used to receive a second control channel sent by the sending-end device. The second control channel is used to schedule a second data channel. The second control channel includes third instruction information. The third instruction information instructs the second data channel for retransmitting the first transmission block.

When the receiving-end device 300 transmits the NACK information corresponding to the first transmission block through the first control resource, the processing unit 320 is further used to determine a second control resource. The second control resource is used to transmit the feedback information corresponding to the first transmission block in the second data channel.

Optionally, the third instruction information is further used to instruct the redundancy version corresponding to the first transmission block in the second data channel.

Optionally, the second control channel includes fourth instruction information. The fourth instruction information is used by the receiving-end device to determine the second control resource.

Optionally, the communication unit 310 is further used to receive the second control channel sent by the sending-end device. The second control channel is used to schedule the second data channel. The second control channel includes the third instruction information. The third instruction information instructs the second data channel for retransmitting the first transmission block.

When the receiving-end device 300 successfully receives the first data channel, the communication unit 310 is further used not to receive the second data channel.

Optionally, the receiving-end device 300 is applied to at least one of D2D communication, V2V communication, V2X communication, cellular network communication, and MTC.

It should be understood that the receiving-end device 300 according to the embodiment of the disclosure may correspond to the receiving-end device in the embodiment of the method of the disclosure, and the foregoing and other operations and/or functions of each unit in the receiving-end device 300 respectively implement the corresponding process of the receiving-end device in the method 200 shown in FIG. 3, which will not be repeated here for the sake of brevity.

Figure 8:
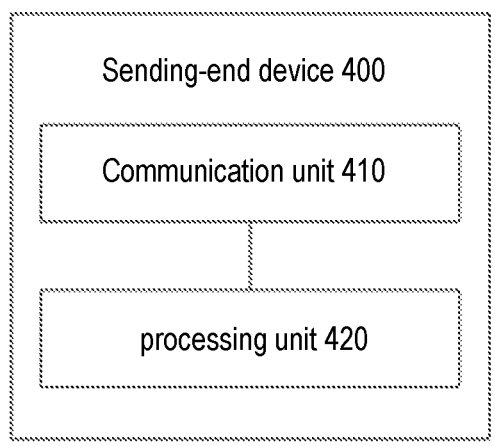
FIG. 8 is a schematic block diagram of a sending-end device according to an embodiment of the disclosure.

FIG. 8 shows a schematic block diagram of a sending-end device 400 according to an embodiment of the disclosure. As shown in FIG. 8, the sending-end device 400 includes the following.

A communication unit 410 is used to send a first control channel and a first data channel to at least two receiving-end devices. The first control channel is used to schedule the first data channel. The first data channel is used to transmit a first transmission block. The first transmission block includes information sent to the at least two receiving-end devices. Feedback information corresponding to the first transmission block in the first data channel is transmitted through a first control resource.

The communication unit 410 is further used to detect the feedback information corresponding to the first transmission block in the first data channel on the first control resource.

Optionally, the first control channel includes first instruction information. The first instruction information is used for at least one of the at least two receiving-end devices to determine the first control resource.

Optionally, the first control resource includes a first feedback channel resource. The first feedback channel resource is used to transmit NACK information corresponding to the first transmission block in the first data channel.

Optionally, the sending-end device 400 further includes a processing unit 420. When the sending-end device 400 detects the NACK information on the first feedback channel resource, the processing unit 420 assumes that at least one of the at least two receiving-end devices does not correctly receive the first data channel; and/or when the sending-end device 400 does not detect the NACK information on the first feedback channel resource, the processing unit 420 assumes that at least one of the at least two receiving-end devices correctly receives the first data channel.

Optionally, the first control resource includes a first feedback channel resource and a second feedback channel resource. The first feedback channel resource is used to transmit the ACK information corresponding to the first transmission block in the first data channel. The second feedback channel resource is used to transmit the NACK information corresponding to the first transmission block in the first data channel.

Optionally, at least one of time domain resources, frequency domain resources, code domain resources, and space domain resources corresponding to the first feedback channel resource and the second feedback channel resource are different.

Optionally, the sending-end device 400 further includes the processing unit 420.

When the sending-end device 400 detects the ACK information on the first feedback channel resource, the processing unit 420 assumes that at least one of the at least two receiving-end devices correctly receives the first data channel; and/or when the sending-end device 400 detects the NACK information on the second feedback channel resource, the processing unit 420 assumes that at least one of the at least two receiving-end devices does not correctly receive the first data channel.

Optionally, the first control resource includes at least two feedback channel resources.

The at least two feedback channel resources correspond one-to-one to the at least two receiving-end devices.

Optionally, at least one of time domain resources, frequency domain resources, code domain resources, and space domain resources corresponding to any two of the at least two feedback channel resources are different.

Optionally, the at least two receiving-end devices include a first receiving-end device.

The communication unit 410 is further used to send first configuration information to the first receiving-end device. The first configuration information is used by the first receiving-end device to determine its corresponding first feedback channel resource.

Optionally, the at least two receiving-end devices include the first receiving-end device.

The communication unit 410 is further used to send the first configuration information to the first receiving-end device. The first configuration information is used by the first receiving-end device to determine its location information in a first device group and is used by the first receiving-end device to determine its corresponding first feedback channel resource according to the determined location information. The first device group includes the at least two receiving-end devices.

Optionally, the sending-end device 400 further includes the processing unit 420.

When the sending-end device 400 detects the ACK information on the first feedback channel resource, the processing unit 420 assumes that the first receiving-end device correctly receives the first data channel; and/or when the sending-end device 400 detects the NACK information on the first feedback channel resource, the processing unit 420 assumes that the first receiving-end device does not correctly receive the first data channel; and/or when the sending-end device 400 does not detect any information on the first feedback channel resource, the processing unit 420 assumes that the first receiving-end device does not correctly receive the first data channel.

Optionally, the first control channel includes second instruction information.

The second instruction information is used to instruct that the first transmission block in the first data channel is newly transmitted data; and/or the second instruction information is used to instruct a redundancy version corresponding to the first transmission block in the first data channel.

Optionally, the sending-end device 400 detects the NACK information on the first control resource as the followings.

The communication unit 410 is further used to send a second control channel and a second data channel to the at least two receiving-end devices. The second control channel is used to schedule the second data channel. The second control channel includes third instruction information. The third instruction information instructs the second data channel for retransmitting the first transmission block.

Optionally, the third instruction information is further used to instruct the redundancy version corresponding to the first transmission block in the second data channel.

Optionally, the communication unit 410 is further used to detect the feedback information corresponding to the first transmission block in the second data channel on a second control resource. The second control resource is used to transmit the feedback information corresponding to the first transmission block in the second data channel.

Optionally, the second control channel includes fourth instruction information. The fourth instruction information is used by the at least two receiving-end devices to determine the second control resource.

Optionally, the sending-end device 400 is applied to at least one of D2D communication, V2V communication, V2X communication, cellular network communication, and MTC.

It should be understood that the sending-end device 400 according to the embodiment of the disclosure may correspond to the sending-end device in the embodiment of the method of the disclosure, and the foregoing and other operations and/or functions of each unit in the sending-end device 400 respectively implement the corresponding process of the sending-end device in the method 200 shown in FIG. 3, which will not be repeated here for the sake of brevity.

Figure 9:
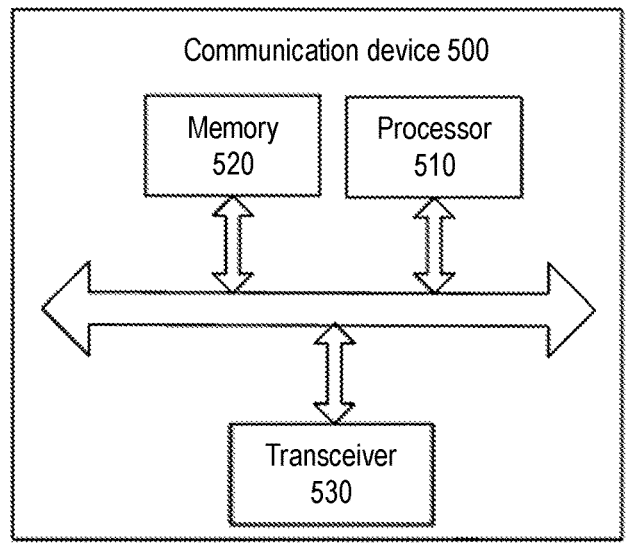
FIG. 9 is a schematic block diagram of a communication device according to an embodiment of the disclosure.

FIG. 9 is a schematic structural diagram of a communication device 500 according to an embodiment of the disclosure. The communication device 500 shown in FIG. 9 includes a processor 510. The processor 510 may call and run a computer program from a memory 520 to implement the method in the embodiment of the disclosure.

Optionally, as shown in FIG. 9, the communication device 500 may further include a memory 520. The processor 510 may call and run a computer program from the memory 520 to implement the method in the embodiment of the disclosure.

The memory 520 may be a separate device independent of the processor 510 or may be integrated in the processor 510.

Optionally, as shown in FIG. 9, the communication device 500 may further include a transceiver 530. The processor 510 may control the transceiver 530 to communicate with other devices. Specifically, the transceiver 530 may send information or data to other devices or receive information or data sent by other devices.

The transceiver 530 may include a transmitter and a receiver. The transceiver 530 may further include an antenna. The number of the antenna may be one or more.

Optionally, the communication device 500 may specifically be the sending-end device of the embodiment of the disclosure, and the communication device 500 may implement the corresponding process implemented by the sending-end device in each method of the embodiment of the disclosure, which will not be repeated here for the sake of brevity.

Optionally, the communication device 500 may specifically be the receiving-end device of the embodiment of the disclosure, and the communication device 500 may implement the corresponding process implemented by the receiving-end device in each method of the embodiment of the disclosure, which will not be repeated here for the sake of brevity.

Figure 10:
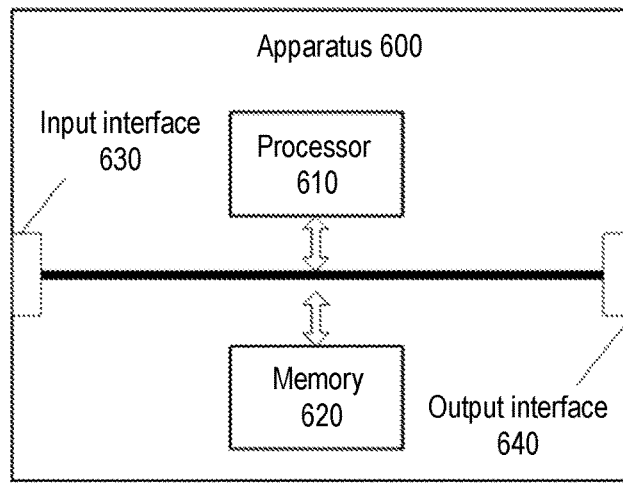
FIG. 10 is a schematic block diagram of an apparatus according to an embodiment of the disclosure.

FIG. 10 is a schematic structural diagram of an apparatus according to an embodiment of the disclosure. An apparatus 600 shown in FIG. 10 includes a processor 610. The processor 610 may call and run a computer program from a memory 620 to implement the method in the embodiment of the disclosure.

Optionally, as shown in FIG. 10, the apparatus 600 may further include a memory 620. The processor 610 may call and run a computer program from the memory 620 to implement the method in the embodiment of the disclosure.

The memory 620 may be a separate device independent of the processor 610 or may be integrated in the processor 610.

Optionally, the apparatus 600 may further include an input interface 630. The processor 610 may control the input interface 630 to communicate with other devices or chips. Specifically, the input interface 630 may obtain information or data sent by other devices or chips.

Optionally, the apparatus 600 may further include an output interface 640. The processor 610 may control the output interface 640 to communicate with other devices or chips. Specifically, the output interface 640 may output information or data to other devices or chips.

Optionally, the apparatus may be applied to the sending-end device in the embodiment of the disclosure, and the apparatus may implement the corresponding process implemented by the sending-end device in each method of the embodiment of the disclosure, which will not be repeated here for the sake of brevity.

Optionally, the apparatus may be applied to the receiving-end device in the embodiment of the disclosure, and the apparatus may implement the corresponding process implemented by the receiving-end device in each method of the embodiment of the disclosure, which will not be repeated here for the sake of brevity.

Optionally, the apparatus mentioned in the embodiment of the disclosure may also be a chip. For example, the device may be a system-level chip, a system chip, a chip system, a system-on-chip, etc.

Figure 11:
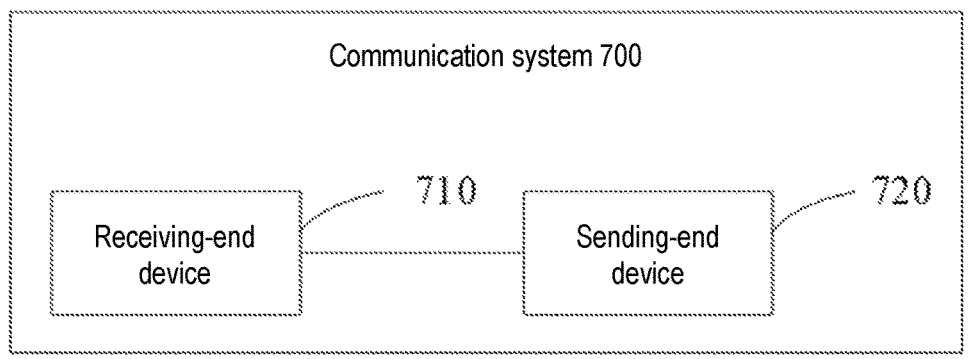
FIG. 11 is a schematic block diagram of a communication system according to an embodiment of the disclosure.

FIG. 11 is a schematic block diagram of a communication system 700 according to an embodiment of the disclosure. As shown in FIG. 11, the communication system 700 includes a receiving-end device 710 and a sending-end device 720.

The receiving-end device 710 may be used to implement the corresponding functions implemented by the receiving-end device in the above method, and the sending-end device 720 may be used to implement the corresponding functions implemented by the sending-end device in the above method, which will not be repeated here.

It should be understood that the processor in the embodiment of the disclosure may be an integrated circuit chip with signal processing capability. During the implementation process, each step of the embodiment of the method may be completed by hardware integrated logic circuits in the processor or commands in the form of software. The processor may be a general-purpose processor, a digital signal processor (DSP), an application specific integrated circuit (ASIC), a field programmable gate array (FPGA), or other programmable logic devices, discrete gate or transistor logic devices, or discrete hardware components that may implement or execute each method, step, and logical block diagram disclosed in the embodiment of the disclosure. The general processor may be a microprocessor or the processor may also be any conventional processor, etc. The steps in combination with the method disclosed in the embodiment of the disclosure may be directly embodied as being executed and completed by a hardware decoding processor or executed and completed by a combination of hardware and software modules in a decoding processor. The software module may be located in a mature storage medium in the art such as random memory, a flash memory, a read-only memory, a programmable read-only memory, an electrically erasable programmable memory, or a register. The storage medium is located in the memory. The processor reads information in the memory and completes the steps of the above method in combination with its hardware.

It can be understood that the memory in the embodiment of the disclosure may be a volatile memory or a non-volatile memory or may include both volatile and non-volatile memories. The non-volatile memory may be a read-only memory (ROM), a programmable ROM (PROM), an erasable PROM (EPROM), an electrically EPROM (EEPROM), or a flash memory. The volatile memory may be a random access memory (RAM), which is used as an external cache. Through exemplary but not restrictive description, many forms of RAM may be used, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SL-DRAM), and a direct rambus RAM (DR RAM). It should be noted that the memory of the system and the method described herein is intended to include but not limited to these and any other suitable types of memories.

It should be understood that the memory is exemplary but not restrictive description. For example, the memory in the embodiment of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SL-DRAM), a direct rambus RAM (DR RAM), etc. In order words, the memory in the embodiment of the disclosure is intended to include but not limited to these and any other suitable types of memories.

The embodiment of the disclosure further provides a computer-readable storage medium for storing a computer program.

Optionally, the computer-readable storage medium may be applied to the sending-end device in the embodiment of the disclosure, and the computer program enables a computer to execute the corresponding process implemented by the sending-end device in each method of the embodiment of the disclosure, which will not be repeated here for the sake of brevity.

Optionally, the computer-readable storage medium may be applied to the receiving-end device in the embodiment of the disclosure, and the computer program enables the computer to execute the corresponding process implemented by the receiving-end device in each method of the embodiment of the disclosure, which will not be repeated here for the sake of brevity.

The embodiment of the disclosure further provides a computer program product, which includes a computer program command.

Optionally, the computer program product may be applied to the sending-end device in the embodiment of the disclosure, and the computer program instruction enables the computer to execute the corresponding process implemented by the sending-end device in each method of the embodiment of the disclosure, which will not be repeated here for the sake of brevity.

Optionally, the computer program product may be applied to the receiving-end device in the embodiment of the disclosure, and the computer program instruction enables the computer to execute the corresponding process implemented by the receiving-end device in each method of the embodiment of the disclosure, which will not be repeated here for the sake of brevity.

The embodiment of the disclosure further provides a computer program.

Optionally, the computer program may be applied to the sending-end device in the embodiment of the disclosure. When the computer program is run on the computer, the computer is enabled to execute the corresponding process implemented by the sending-end device in each method of the embodiment of the disclosure, which will not be repeated here for the sake of brevity.

Optionally, the computer program may be applied to the receiving-end device in the embodiment of the disclosure. When the computer program is run on the computer, the computer is enabled to execute the corresponding process implemented by the receiving-end device in each method of the embodiment of the disclosure, which will not be repeated here for the sake of brevity.

Persons skilled in the art may be aware that the units and calculation steps of each example described in combination with the embodiments disclosed herein can be implemented by electronic hardware or a combination of computer software and electronic hardware. Whether the functions are executed by hardware or software depends on the specific application and design constraint conditions of the technical solution. Professionals and technicians may use different methods for each specific application to implement the described functions, but such implementation should not be considered as exceeding the scope of the disclosure.

Persons skilled in the art may clearly understand that for the convenience and brevity of description, for the specific working processes of the system, the apparatus, and the unit described above, reference may be made to the corresponding processes in the embodiment of the method, which will not be repeated here.

In the several embodiments provided in the disclosure, it should be understood that the disclosed system, apparatus, and method may be implemented through other ways. For example, the embodiment of the apparatus described above is merely illustrative. For example, the division of the unit is only a logical function division, and there may be other ways of division during actual implementation. For example, multiple units or components may be combined or may be integrated into another system, or some features may be ignored or not implemented. In addition, the displayed or discussed mutual coupling, direct coupling, or communication connection may be indirect coupling or communication connection through some interfaces, apparatuses, or units, and may be in electrical, mechanical, or other forms.

The units described as separate parts may or may not be physically separated. The parts displayed as units may or may not be physical units, that is, the parts may be located in one place or may be distributed on multiple network units. Some or all of the units may be selected according to actual requirements to implement the objectives of the solutions of the embodiments.

In addition, the functional units in each embodiment of the disclosure may be integrated into one processing unit, each unit may exist alone physically, or two or more units may be integrated into one unit.

If the functions are implemented in the form of a software functional unit and are sold or used as an independent product, the functions may be stored in one computer-readable storage medium. For such understanding, the essence of the technical solution, the part that contributes to the prior art, or a part of the technical solution of the disclosure may be embodied in the form of a software product. The computer software product is stored in a storage medium, which includes several commands for enabling a computer device (which may be a personal computer, a server, a network device, etc.) to execute all or part of the steps of the method described in each embodiment of the disclosure. The storage medium includes a U disk, a mobile hard disk, a read-only memory (ROM), a random access memory (RAM), a magnetic disk, an optical disk, or various media that may store program codes.

The above are only specific implementations of the disclosure, but the protection scope of the disclosure is not limited thereto. Persons skilled in the art may easily think of changes or replacements within the technical scope disclosed by the disclosure, which should be covered within the protection scope of the disclosure. Therefore, the protection scope of the disclosure shall be defined by the protection scope of the claims.

What is claimed is:

1. A wireless communication method, comprising:
receiving, by a receiving-end device, a first control channel sent by a sending-end device, wherein the first control channel is used to schedule a first data channel, the first data channel is used to transmit a first transmission block, the first transmission block comprises information sent to at least two receiving-end devices, and the at least two receiving-end devices comprise the receiving-end device;
determining, by the receiving-end device, a first control resource, wherein the first control resource is used to transmit feedback information corresponding to the first transmission block in the first data channel, the first control resource comprises a first feedback channel resource, and the first feedback channel resource is used to transmit negative acknowledgement (NACK) information corresponding to the first transmission block in the first data channel;
transmitting, by the receiving-end device, the NACK information corresponding to the first transmission block in the first data channel on the first feedback channel resource when the receiving-end device does not correctly receive the first data channel; and/or
not performing, by the receiving-end device, hybrid automatic repeat request (HARQ) feedback on the first feedback channel resource when the receiving-end device correctly receives the first data channel.

2. The method according to claim 1, wherein the first control channel comprises first instruction information, and the first instruction information is used by the receiving-end device to determine the first control resource.

3. The method according to claim 1, wherein the first control resource comprises a first feedback channel resource and a second feedback channel resource, wherein the first feedback channel resource is used to transmit acknowledgement (ACK) information corresponding to the first transmission block in the first data channel, and the second feedback channel resource is used to transmit the NACK information corresponding to the first transmission block in the first data channel.

4. The method according to claim 3, further comprising:
transmitting, by the receiving-end device, ACK information corresponding to the first transmission block in the first data channel on the first feedback channel resource when the receiving-end device correctly receives the first data channel; and/or
transmitting, by the receiving-end device, NACK information corresponding to the first transmission block in the first data channel on the second feedback channel resource when the receiving-end device does not receive the first data channel.

5. The method according to claim 1, wherein the first control resource comprises at least two feedback channel resources, wherein the at least two feedback channel resources correspond one-to-one to the at least two receiving-end devices;
the method further comprises:
determining, by the receiving-end device, a first feedback channel resource corresponding to the receiving-end device from the at least two feedback channel resources.

6. The method according to claim 1, further comprising:
receiving, by the receiving-end device, a second control channel sent by the sending-end device, wherein the second control channel is used to schedule a second data channel, the second control channel comprises second instruction information, and the second instruction information instructs the second data channel for retransmitting the first transmission block;

determining, by the receiving-end device, a second control resource when the receiving-end device transmits NACK information corresponding to the first transmission block through the first control resource, wherein the second control resource is used to transmit feedback information corresponding to the first transmission block in the second data channel.

7. A wireless communication method, comprising:
sending, by a sending-end device, a first control channel and a first data channel to at least two receiving-end devices, wherein the first control channel is used to schedule the first data channel, the first data channel is used to transmit a first transmission block, the first transmission block comprises information sent to the at least two receiving-end devices, and feedback information corresponding to the first transmission block in the first data channel is transmitted through a first control resource, the first control resource comprises a first feedback channel resource, and the first feedback channel resource is used to transmit negative acknowledgement (NACK) information corresponding to the first transmission block in the first data channel;
detecting, by the sending-end device, feedback information corresponding to the first transmission block in the first data channel on the first control resources;
assuming, by the sending-end device, that at least one of the at least two receiving-end devices does not correctly receive the first data channel when the sending-end device detects NACK information on the first feedback channel resource; and/or
assuming, by the sending-end device, that at least one of the at least two receiving-end devices correctly receives the first data channel when the sending-end device does not detect NACK information on the first feedback channel resource.

8. The method according to claim 7, wherein the first control channel comprises first instruction information, and the first instruction information is used by at least one of the at least two receiving-end devices to determine the first control resource.

9. The method according to claim 7, wherein the first control resource comprises a first feedback channel resource and a second feedback channel resource, wherein the first feedback channel resource is used to transmit acknowledgement (ACK) information corresponding to the first transmission block in the first data channel, and the second feedback channel resource is used to transmit NACK information corresponding to the first transmission block in the first data channel.

10. The method according to claim 9, further comprising:
assuming, by the sending-end device, that at least one of the at least two receiving-end devices correctly receives the first data channel when the sending-end device detects ACK information on the first feedback channel resource; and/or
assuming, by the sending-end device, that at least one of the at least two receiving-end devices does not correctly receive the first data channel when the sending-end device detects NACK information on the second feedback channel resource.

11. The method according to claim 7, wherein when the sending-end device detects NACK information on the first control resource, the method further comprises:
sending, by the sending-end device, a second control channel and a second data channel to the at least two receiving-end devices, wherein the second control channel is used to schedule the second data channel, the second control channel comprises second instruction information, and the second instruction information instructs the second data channel for retransmitting the first transmission block.

12. The method according to claim 7, further comprising:
detecting, by the sending-end device, feedback information corresponding to the first transmission block in the second data channel on a second control resource, wherein the second control resource is used to transmit feedback information corresponding to the first transmission block in the second data channel.

13. The method according to claim 12, wherein the second control channel comprises third instruction information, and the third instruction information is used by the at least two receiving-end devices to determine the second control resource.

14. A receiving-end device, comprising:
a transceiver, used to receive a first control channel sent by a sending-end device, wherein the first control channel is used to schedule a first data channel, the first data channel is used to transmit a first transmission block, the first transmission block comprises information sent to at least two receiving-end devices, and the at least two receiving-end devices comprise the receiving-end device;
a processor, used to determine a first control resource, wherein the first control resource is used to transmit feedback information corresponding to the first transmission block in the first data channel, the first control resource comprises a first feedback channel resource, and the first feedback channel resource is used to transmit negative acknowledgement (NACK) information corresponding to the first transmission block in the first data channel, and the transceiver is further used to
transmit the NACK information corresponding to the first transmission block in the first data channel on the first feedback channel resource when the receiving-end device does not correctly receive the first data channel; and/or
not performing hybrid automatic repeat request (HARQ) feedback on the first feedback channel resource when the receiving-end device correctly receives the first data channel.

* * * * *